United States Patent [19]

Reyes

[11] Patent Number: 5,749,505
[45] Date of Patent: *May 12, 1998

[54] AUTOFOLDABLE GARMENT HANGER FOR MOTOR VEHICLE

[76] Inventor: Daniel Reyes, 11530 Griffing Blvd. #11, North Miami, Fla. 33161

[*] Notice: The terminal 16 months of this patent has been disclaimed.

[21] Appl. No.: 380,037

[22] Filed: Jan. 30, 1995

[51] Int. Cl.⁶ ........................................... B60R 7/00
[52] U.S. Cl. ..................... 224/482; 224/276; 224/927; 223/94
[58] Field of Search .................... 224/276, 482, 224/927; 248/308; 223/94

[56] References Cited

U.S. PATENT DOCUMENTS 2,557,537  6/1951  Ellison ........................... 224/927
4,863,081  9/1989  Gabbert .......................... 224/927
5,145,098  9/1992  Tung ............................... 223/94

Primary Examiner—Henry J. Recla
Assistant Examiner—Timothy L. Maust

[57] ABSTRACT

A foldable garment hanger having two laterally disposed arm members and central hanger body assemblies, the latter connected to each other by a central vertically disposed hinge assembly. A loop member mounted to the central hinge assembly and a foldable handle assembly hingedly mounted to the central hanger body assemblies. The loop member and handle assembly are removably mounted to a hook member previously installed in the roof of a motor vehicle, and two supporting members located to both sides of the hook member to provide more stability to the garment hanger supporting the handle assembly. The handle assembly has another central hinge assembly located in the center between two hanger members. The handle assembly in an unfolded position is used to carry the garment hanger, and in a folded position permits the foldable garment hanger to be folded.

2 Claims, 3 Drawing Sheets

AUTOFOLDABLE GARMENT HANGER FOR MOTOR VEHICLE

BACKGROUND OF THE INVENTION

1. Field of the Invention

The present invention relates to a garment hanger, and more particularly, to the type that is foldable, easy to transport and manipulate by a user.

2. Description of the Related Art

There are several types of foldable garment hangers presently used inside motor vehicles. However, none of them include the features of the present invention. The present invention overcomes the disadvantages of the other conventional hangers, because the preferred embodiment has a handle adapted to the entire structure that can be used as a supporting member for the garment hanger inside a mobile motor vehicle and in the same way as a handle member to carry the garment hanger outside the vehicle. The handle assembly disclosed herein, is vertically and horizontally foldable, that provides the garment hanger structure a practical and comfortable use. The present invention is an improvement of the folded garment hangers that exit in the market. Also, none of them provide a user an easy way of taking clothes from the garment hanger as the present invention does.

SUMMARY OF THE INVENTION

It is the main object of the present invention to provide a garment hanger that permits a user to remove or take the clothes off the hanger with a minimum of time and effort.

It is another object of this invention to provide a garment hanger for vehicles that is foldable and volumetrically easy to transport and manipulate by a user.

It is still another object of the present invention to provide a garment hanger that has a handle that can be adapted to form part of the entire structure of the embodiment while the garment hanger hangs clothes supported by a loop member. A handle that also can be adapted to carry the garment hanger outside the vehicle with the maximum of comfort.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
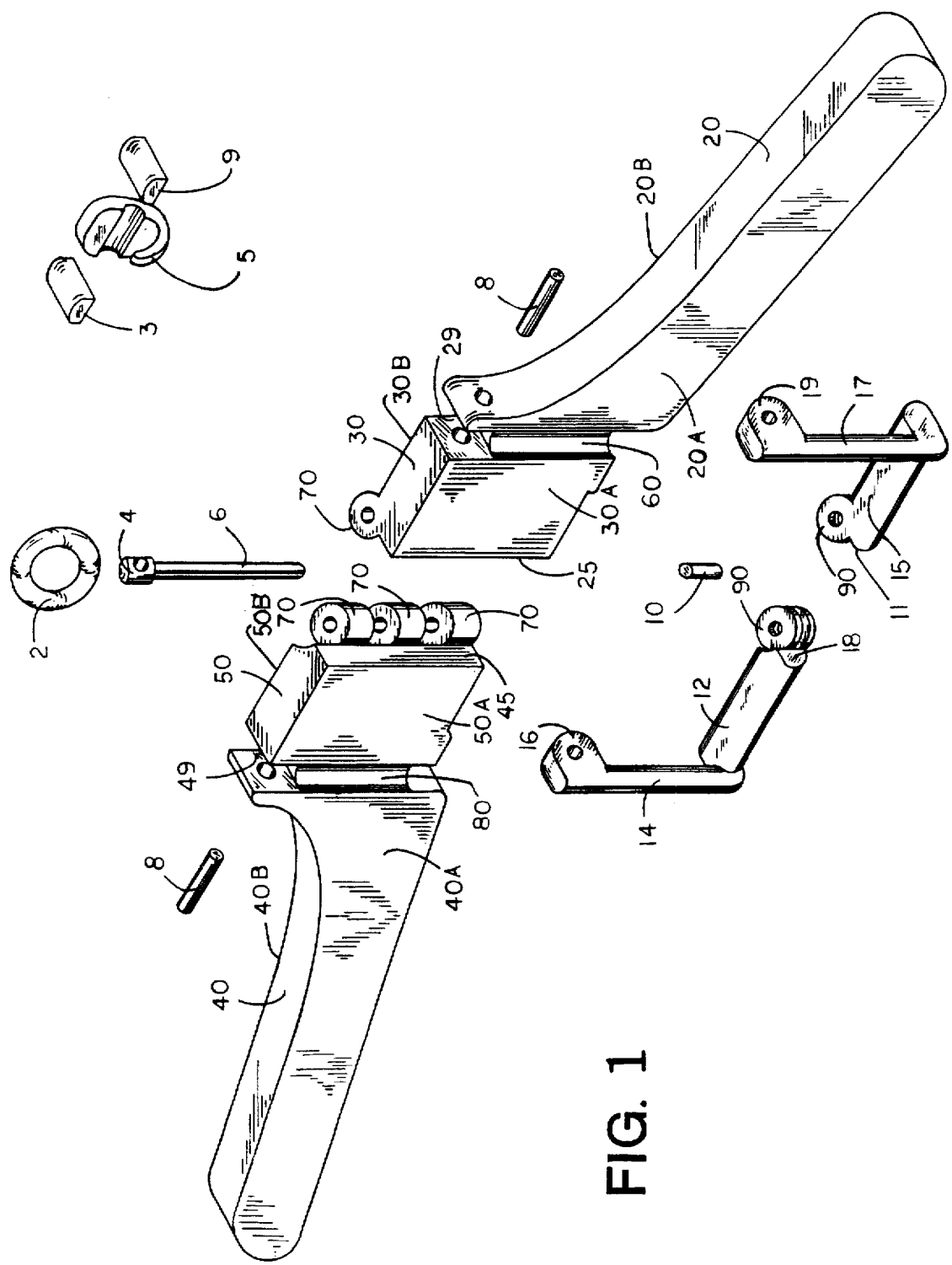
FIG. 1 is an isometric exploded view of all parts that form the preferred embodiment subject of the present invention.

Referring now to the drawings, it can be observed that the present invention basically includes arm members 20 and 40, hanger body assemblies 30 and 50, handle assembly 100, loop member 2 mounted to head 4 of pivot pin 6 and supporting members 3 and 9.

As shown in FIG. 1, the garment hanger disclosed herein, is an assembly of different parts forming the preferred embodiment. The preferred embodiment includes arm members 20 and 40 which are outwardly extending from hanger body assemblies 30 and 50, respectively. Arm members 20 and 40 have front arm surfaces 20A and 40A, and rear arm surfaces 20B and 40B, respectively. In the same manner, hanger body assemblies 30 and 50 have front surfaces 30A and 50A, and rear surfaces 30B and 50B, respectively, as shown in FIGS. 1 through 5. Hanger body assemblies 30 and 50, in the preferred embodiment, are connected to each other by pin hinge assembly 70 rigidly mounted to rear surfaces 30B and 50B. Hanger body assemblies 30 and 50 also are connected through stopping surfaces 25 and 45 that prevent assemblies 30 and 50 from pivoting more than 180 degrees with respect to surfaces 30B and 50B. In this manner, assemblies 30 and 50 (and arm members 20 and 40) can be folded only in one direction, where surfaces 20B and 40B, (and surfaces 30B and 50B) meet each other. Pin hinge assembly 70, as a conventional hinge assembly, comprises two sections with annular joint members having openings. The openings of each annular joint member of hanger body assemblies 30 and 50, are in coaxial vertical alignment forming an elongated tubular guide member through which pin 6 passes.

Figure 2:
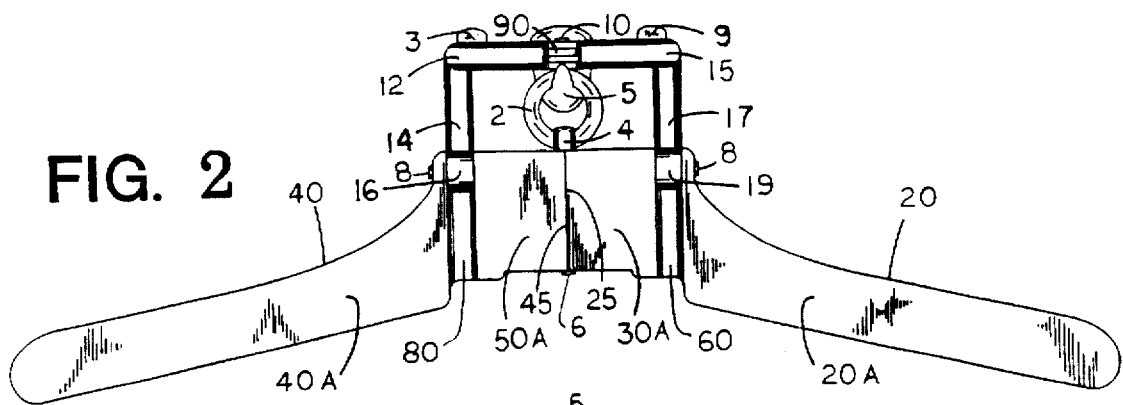
FIG. 2 is an elevational front view of the present invention showing a handle and a loop both used for hanging a garment hanger on a hook mounted inside a motor vehicle.

Handle assembly 100 for the garment hanger, subject of the present invention, includes two L-shaped members connected to each other by hinge assembly 90, as best seen in FIG. 1. L-shaped members of handle assembly 100 have handle members 12 and 15 disposed in linear alignment with respect to each other and connected through stopping surfaces 11 and 18. Handle members 12 and 15 have arms 14 and 17 rigidly mounted at one end, respectively, forming two "L" shape members. Arms 14 and 17 have hinge members 16 and 19 at their distal ends and are pivotally mounted within cavities 29 and 45, as best seen in FIG. 2. Arms 14 and 17 are held within cavities 29 and 45 by pin members 8. Pin members 8 pass through openings located at the inner and uppermost portions or arms 20 and 40, and openings located in the outer and lateral surfaces of hanger body assemblies 30 and 50, as best illustrated in FIG. 1.

Figure 4:
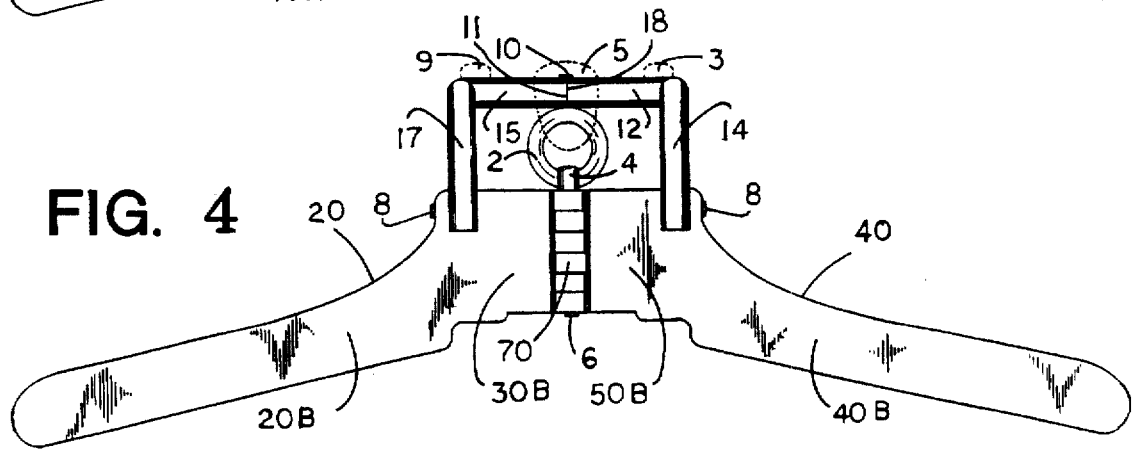
FIG. 4 is an elevational rear view of the invention, previously shown in FIG. 2.
Figure 5:
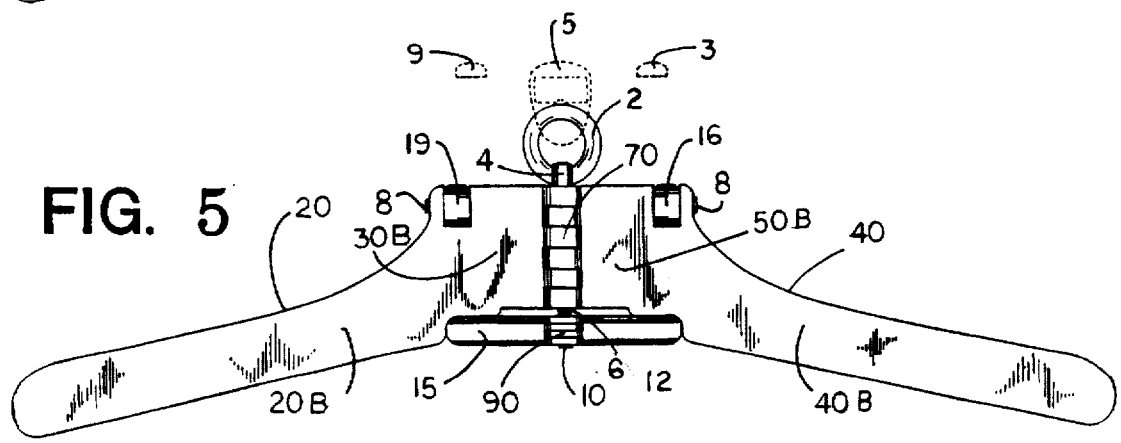
FIG. 5 is an elevational rear view of the invention, previously shown in FIG. 3.

As seen in FIGS. 2 and 4, loop member 2 and handle members 12 and 15 hold body 300. Body 300 comprises arm members 20 and 40, and body hanger assemblies 30 and 50. Loop member 2 is supported by hook 5 which in turn is preferably installed to the roof inside a motor vehicle. Handle members 12 and 15 are held in place and in parallel relationship with respect to the ground sandwiched between supporting members 3 and 9, loop member 2 and hook member 5. Supporting members 3 and 9 are designed to prevent the garment hanger from swinging and bouncing off hook 5 when the vehicle hits a bump or turns a corner. As shown in FIG. 2, handle assembly 100 is unfolded, that means in use position. Hinge assemblies 70 and 90 are located on opposite sides. Hinge assembly 70 is located on the rear side of hanger body assemblies 30 and 50 and hinge assembly 90 is located on the front side of assemblies 30 and 50. These two opposite positions of hinge assemblies 70 and 90 permit body 300 to be in a completely linear alignment and unflexible state, that is similar to a conventional unfolded garment hanger.

Figure 3:
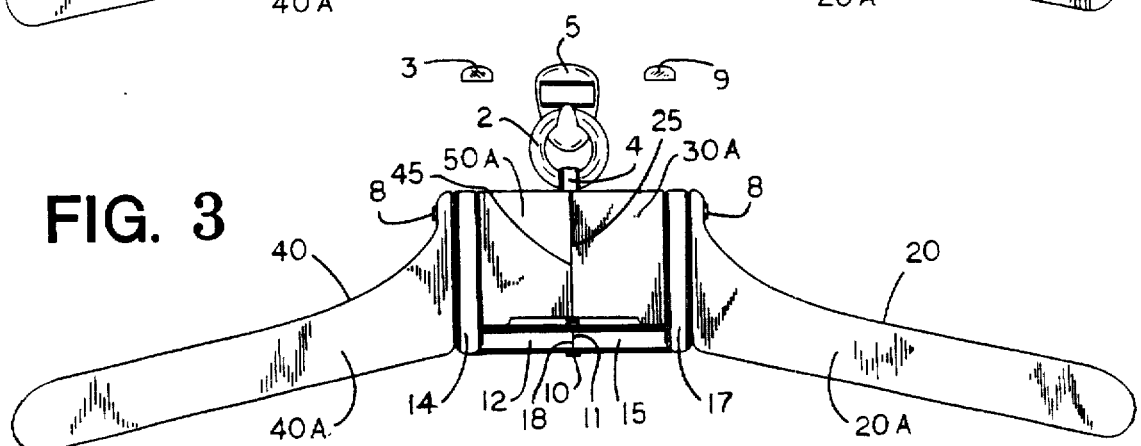
FIG. 3 is an elevational front view of the invention showing the handle in folded position.
Figure 6:
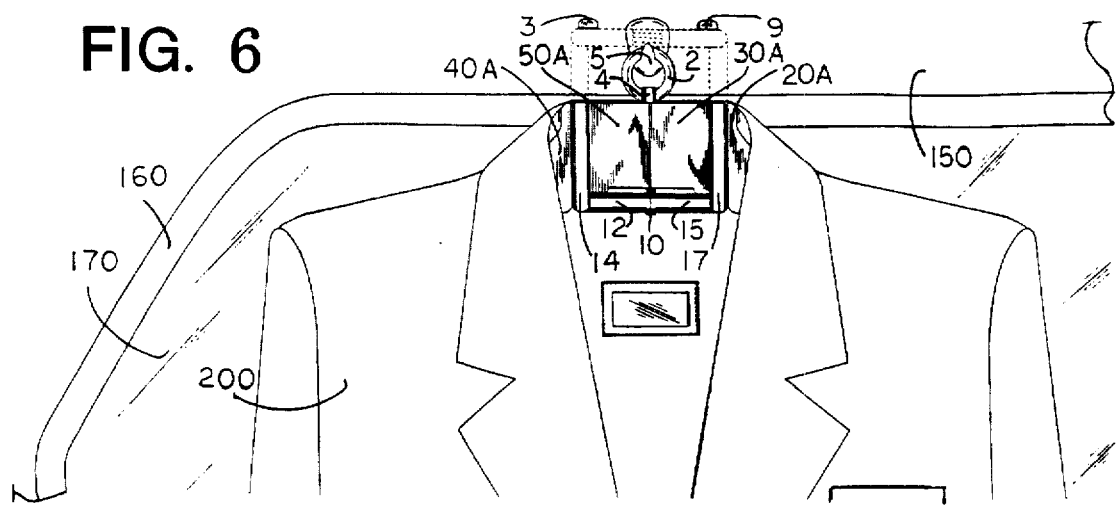
FIG. 6 shows a partial view of the back interior of a motor vehicle, where the present invention is used for hanging a coat.
Figure 7:
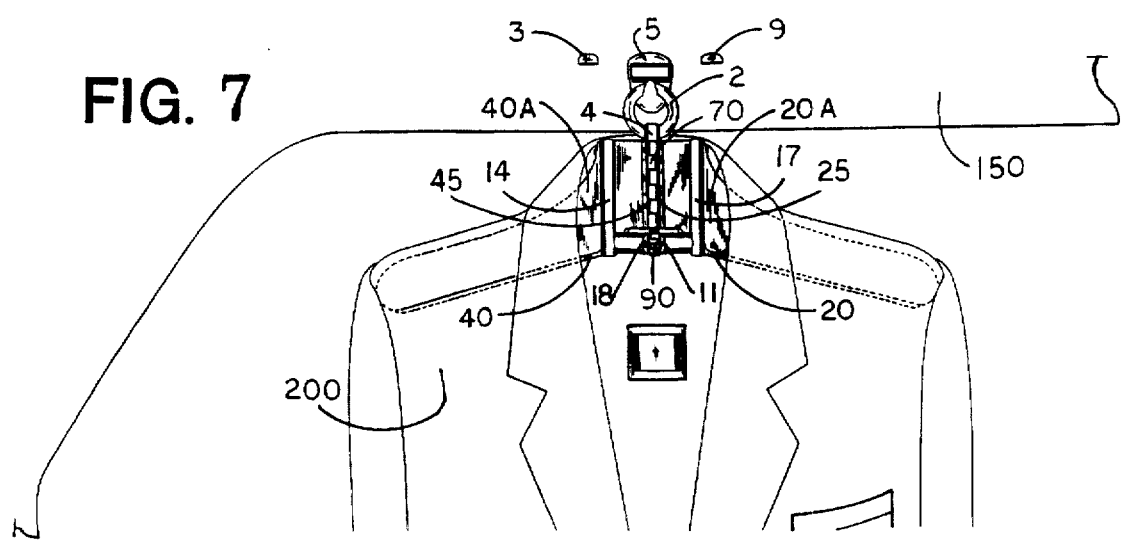
FIG. 7 is an elevational front view of the previous figure showing the mechanism for folding the preferred embodiment.
Figures 8, 9:
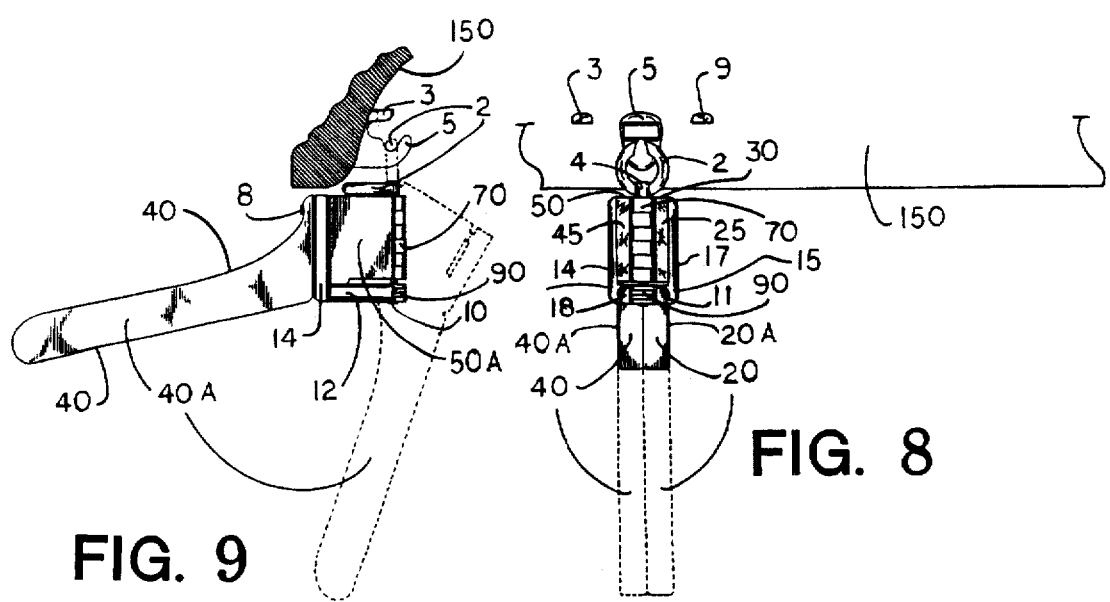
FIG. 8 shows the present invention in a folded state.
FIG. 9 is an elevational side view of the folded garment hanger, where it can be retrieved from a hook mounted inside a vehicle.

As described above, one of the advantages of the present invention is to facilitate a user fast and easy removal of his or her clothes from the garment hanger, previously hanged in the back 160 inside vehicle 150. A user can take the clothes off the garment hanger after opening the back door 170 and downwardly fold handle assembly 100 about pins 8 of hinge members 16 and 19, as shown in FIGS. 3 and 6. In this manner, arm members 14 and 17 are stored within channels 60 and 80 that are located between front arm surfaces 20A and 40A, and front surfaces 30 and 50, respectively. Channels 60 and 80 have sufficient depth for arms 14 and 17 to be stored in. Arm members 14 and 17 are co-planar with the surrounded front surfaces 30A and 50A (and 20A and 40A). Hinge assemblies 70 and 90 coincide in a vertical coaxial alignment with respect to each other while hanger body assemblies 30 and 50 (and arm members 15 and 17) pivot about pins 6 and 10. Once arm members 20 and 40 pivot forward, the longitudinal supporting hanger area is reduced, and the clothes can be removed from the arm members 20 and 40 with a simple user's movement, and as best seen in FIGS. 6 and 7. In this manner, arm members 20 and 40 practically do not interfere with the sleeve of coat 200, thereby facilitating to a user an easy access to the clothes. Afterward, body 300 is folded by itself and is ready to be removed from hook member 5, as shown in FIGS. 8 and 9. The folded garment hanger can be stored in a briefcase and is convenient for travelling.

The garment hanger, subject of the present invention also can be used outside the motor vehicle. Handle assembly 100, in an unfolded position, is also designed to carry a coat out of the motor vehicle. Loop member 2 can be used also to hang the garment hanger on any upstanding hook.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A foldable garment hanger, comprising:

A) a foldable body assembly including first and second arm members horizontal and outwardly extending from centrally disposed first and second hanger body assemblies, respectively, and said first and second arm members having each a front surface and a rear surface, and said first and second hanger body assemblies having each a front surface and a rear surface, and said first hanger body assembly being adjacent and connected to said second hanger body assembly by a first hinge assembly, and said first hinge assembly being mounted to said rear surface of said first and second hanger body assemblies and said first hinge assembly having a first pivot pin member with first and second ends where said first end has a head member including an opening;

B) a foldable handle assembly for holding said garment hanger and bringing more stability to said garment hanger when a motor vehicle is moving, and said handle assembly including two L-shaped handle means having first and second handle members horizontally disposed and third and fourth arm members parallel and apart disposed with respect to each other, and said first handle member having said third and fourth ends, and said second handle member having fifth and sixth ends, and third and fifth ends being connected by a vertically and centrally disposed second hinge assembly having a second pivot pin member, and said third and fifth ends each having a stopping surface adjacent to each other, and said third arm member having said fourth end for said first handle member and seventh end, and said fourth arm member having said sixth end for said second handle member and eight end, and said seventh end being connected to a third hinge member with a third pivot pin member, and said eight end being connected to a fourth hinge member with a fourth pivot pin member, and said third and fourth hinge members being finally mounted within first and second cavities of said first and second body assemblies, respectively;

C) a loop member for holding said garment hanger and said loop member being mounted in said opening of said head member of said first pivot pin member;

D) a hook means for being rigidly mounted inside a motor vehicle and for supporting said loop means and said handle assembly; and E) a pair of supporting means being rigidly mounted inside a motor vehicle and located to the both sides of said hook means, and said pair of supporting means for supporting said first and second handle members and bringing more stability to said garment hanger while keeping said first and second handle members in parallel relationship with respect to the ground.

2. The foldable garment hanger set forth in claim 1 further including first and second channels located below third and fourth hinge assemblies for storing third and fourth arm members within, where said third and fourth arm members within said first and second channels are co-planar with said rear surfaces of said first and second hanger body assemblies and said first and second arm members.

\* \* \* \* \*